United States Patent [19]

van Rosmalen

[11] 4,389,101
[45] Jun. 21, 1983

[54] DEVICE FOR PIVOTING AN OPTICAL ELEMENT UNDER ELECTRO-DYNAMIC CONTROL

[75] Inventor: Gerard E. van Rosmalen, Eindhoven, Netherlands

[73] Assignee: U.S. Philips Corporation, New York, N.Y.

[21] Appl. No.: 239,880

[22] Filed: Mar. 2, 1981

[30] Foreign Application Priority Data

Mar. 19, 1980 [NL] Netherlands .......................... 8001617

[51] Int. Cl.³ ............................................. G02B 27/17
[52] U.S. Cl. ....................................... 350/486; 350/6.5; 369/44
[58] Field of Search .......................... 350/6.5, 6.6, 486; 369/44

[56] References Cited

U.S. PATENT DOCUMENTS 4,021,096 5/1977 Dragt .................................. 350/486
4,123,146 10/1978 Dragt .................................. 350/486
4,129,930 12/1978 Dragt .................................. 350/486

Primary Examiner—R. A. Rosenberger
Attorney, Agent, or Firm—Thomas A. Briody; Robert T. Mayer; Algy Tamoshunas

[57] ABSTRACT

Figure 1:
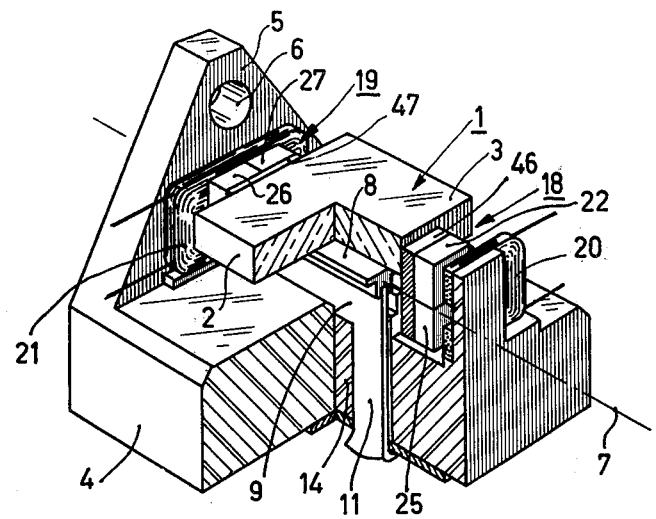

To reduce the susceptibility of an electrodynamically controllable pivoting mirror device to stray magnetic fields, said device comprises a pivoting mirror which is mounted on a frame (4) so as to be pivotable by means of a suitable bearing arrangement (8, 9), on which mirror permanent-magnetic means (22–29) are arranged on which a pivoting torque can be exerted by means of control coils (20, 21) mounted on the frame. By providing the permanent-magnetic means, on the side where they are located, with two zones of north polarity (N) and two zones of south polarity (S), which are situated on diametrically opposed sides relative to the pivoting axis (7), and by moreover having the turns of the control coil extend over zones of north and of south polarity, a pivoting mirror device is obtained whose control coils dissipate a minimum amount of heat and which is less susceptible to external magnetic stray fields produced by components located in the vicinity, such as transformers and electric motors (FIG. 1).

3 Claims, 3 Drawing Figures

DEVICE FOR PIVOTING AN OPTICAL ELEMENT UNDER ELECTRO-DYNAMIC CONTROL

The invention relates to a device for pivoting an optical element such as a pivoting mirror for an optical video disc player, under electrodynamic control, which device comprises: a frame; an optical element which is supported by the frame so as to be pivotable about a pivoting axis; a pivotal bearing arrangement for pivotably supporting the optical element on the frame and comprising pivotable bearing means connected to the optical element and to stationary bearing means connected to the frame; permanent-magnetic means, connected to the optical element, on at least one side of the optical element: and control-coil means, connected to the frame, for generating an electromagnetic control field and thereby exerting a pivoting moment on the permanent-magnetic means.

Such a device for use in video disc players is known from U.S. Pat. No. 4,129,930, assigned to the assignee of the present application and incorporated herein by reference. The optical element comprises a pivoting mirror which is provided with a reflecting surface for reflecting a light beam. To the underside of the pivoting mirror permanent magnets are glued. The control-coil means comprise a single control coil which is arranged around the mirror.

In video disc players the video disc is driven by an electric motor and it has been found that the known device is susceptible to magnetic stray fields produced by the electric motor. The mains transformer in the video disc player also produces magnetic stray fields. The pivoting mirror device serves to position the light beam very accurately and the control coils are included in a servo control loop by means of which the mirror position is controlled. Said stray fields exert varying torques on the pivoting mirror, which complicate the servo control. Similar problems may occur in other devices of the type mentioned in the preamble not only when they are used in video disc players but also in other equipment in which magnetic stray fields occur.

It is an object of the invention to provide a device of the type mentioned in the preamble which is substantially less susceptible to external magnetic fields and the invention is characterized in that: the permanent magnetic means are located on at least one of the axial sides of the optical element; that on each axial side where permanent magnetic means are located, said means comprise two zones of north polarity and two zones of sourth polarity; that said magnetic zones are situated in a plane perpendicular to the pivoting axis: that the north zones are situated diametrically opposite each other at equal distances from the pivoting axis and the south zones are also situated diametrically opposite each other at equal distances from the pivoting axis; that the control-coil means comprise a control coil with turns having parallel sides which extend over a permanent magnetic zone and having portions connecting said parallel sides which portions are situated outside the magnetic zones; that the pivoting axis extends through the centre of the control coil and that relative to the permanent magnetic means, the control coil is oriented in such a way that each of the said parallel sides of each turn is parallel to an imaginary connecting line between a zone of north polarity and a zone of south polarity.

The symmetrical location of the zones of north polarity and of south polarity relative to the pivoting axis prevents the magnetic forces produced by the stray magnetic fields from exerting a resulting moment on the optical element, at least when at any instant the stray magnetic field at the location of the magnetic zones is substantially homogeneous, which is actually the case for many practical applications. An important additional advantage of the invention is that the control coil can be used efficiently because two parallel sides of each turn can contribute to the electrodynamically produced torque exerted on the optical element. The invention may also be used in equipment in which the optical element is pivotable about two pivoting axes which are perpendicular to each other. Obviously the pivotal bearing arrangement should then be suitable for movements of the optical element about the two pivoting axes. For example, a pivot bearing may be employed.

In the device in accordance with the invention it is possible, relative to a pivoting axis being considered, to provide permanent magnetic means on both axial sides of the optical element. This has the advantage in that a pivoting moment which is twice as great can be exerted on the optical element. For such an application an embodiment is of significance which is characterized in that on each axial side, viewed axially, the zones of north polarity and the zones of the south polarity are arranged in a similar pattern and with a similar orientation relative to the pivoting axis. This has the advantage that the device, apart from being less affected by homogeneous stray magnetic fields at the location of the device, is also less impaired by those non-homogeneous stray magnetic fields which are oriented symmetrically relative to a plane perpendicular to the pivoting axis and between the two axial sides.

In order to increase the efficiency of the permanent magnetic means which are used, an embodiment is of significance, which is characterized in that the permanent magnetic means, on each of the sides where they are situated, form part of a magnetic circuit which comprises portions situated nearer the optical element, which portions produce a magnetic short-circuit between zones of north polarity and zones of south polarity.

Figure 3:
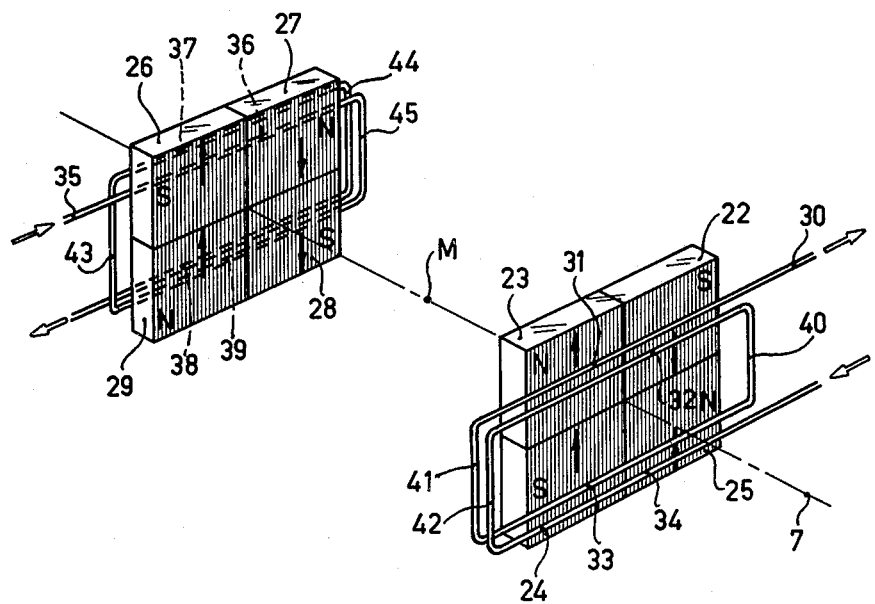
Figure 2:
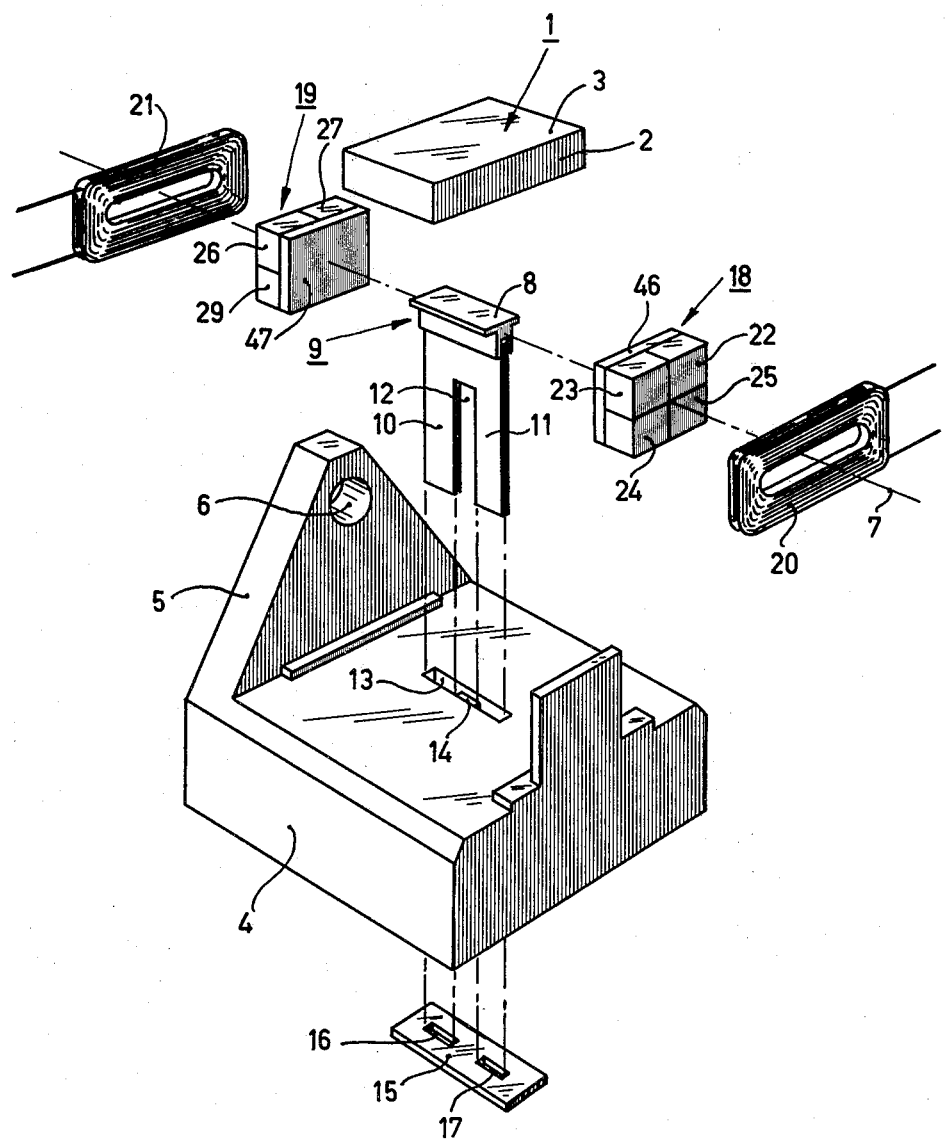

The invention will now be described in more detail with reference to the drawing, in which FIG. 1 is a perspective view, partly in cross-section, of a device in accordance with the invention employing a pivoting mirror, FIG. 2 is an exploded view of the device of FIG. 1, and FIG. 3 schematically represents the electrodynamic action exerted on the permanent magnetic means, which are shown on a slightly enlarged scale, by almost two turns of a control coil.

In the Figures corresponding components are designated by corresponding reference numerals.

An electrodynamically controllable pivoting mirror 1 comprises a glass base 2 provided with a reflecting layer 3. The pivoting mirror is mounted on a frame 4, which is provided with a flange 5 with an opening 6 for mounting the device in a video-disc player. By means of a pivotal bearing arrangement the pivoting mirror is pivotable about a single pivoting axis 7 parallel to its reflecting surface 3. The pivotal bearing arrangement comprises a bearing means, which is pivotably connected to the pivoting mirror and is formed by a plastics bearing 8, which is connected to the underside of the base 2 of the pivoting mirror 1 by glueing, as well as a stationary bearing means, which is connected to the frame and comprises a bearing support 9.

Said bearing support has two limbs 10 and 11, between which a slot 12 is formed. The frame 4 has an opening 13 for each of the limbs 10 and 11 with a central ridge 14 which engages with the slot 12. The limbs 10 and 11 are inserted into the openings 13, so that the ridge 14 engages with the slot 12, after which at the underside of the frame a plate 15 is mounted, which plate 15 has slotted openings 16 and 17 for the two limbs 10 and 11. The ends of the limbs 10 and 11 which extend through the openings 16 and 17 are slightly deformed on assembly, see FIG. 1, so that the bearing support is firmly mounted in the frame 4. The bearing 8 consists of a suitable elastic plastic, such as for example a chloroprene-rubber and is connected to the bearing support 9 in an injection mould. On the sides of the pivoting mirror magnetic circuits 18 and 19 are located. These circuits cooperate with two control coils 20 and 21, which are accommodated on the frame and which produce an electromagnetic control field and thus exert a pivoting moment on the permanent-magnetic means of the magnetic circuits 18 and 19.

The permanent magnetic circuits 18 and 19 are located on the axial sides of the pivoting mirror relative to the pivoting axis 7 of the pivoting mirror 1. The magnetic circuit 18 comprises four permanent magnets 22 to 25 inclusive, and the permanent magnetic circuit 19 comprises four magnets 26 to 29 inclusive. Said magnets are magnetised in a direction parallel to the pivoting axis 7 and thus to the reflecting surface 3 of the pivoting mirror 1. As is indicated by letters in the schematic representation of FIG. 3, the magnets 22, 24, 26 and 28 are magnetised in such a way that a south pole S is directed towards the facing control coil. The other magnets are oppositely polarised, so that a north pole N of these magnets is directed towards the facing control coil. The magnets are flat and are arranged and connected to the pivoting mirror in such a way that the magnetic zones constituted by their front sides are situated in planes perpendicular to the pivoting axis 7. The two north zones of the magnets 23 and 25 are situated diametrically opposite each other, which is also the case with the two north zones of the magnets 27 and 29. The south zones of the magnets 22, 24 and 26, 28 respectively are also situated diametrically opposite each other. On each side the four zones are arranged in such a way that they are equidistantly and uniformly situated around the pivoting axis 7. The turns of the control coils 20 and 21 are each situated in a plane which is also perpendicular to the pivoting axis 7.

FIG. 3 schematically represents almost two turns of each of the control coils 20 and 21. The winding 30 of the control coil 20 has parallel sides 31 to 34 inclusive and the winding 35 of the control coil 19 has parallel sides 36 to 39 inclusive. These sides extend over the permanent magnetic zones and are connected by connecting portions 40 to 42 inclusive and 43 to 45 inclusive which are situated outside the magnetic zones. The pivoting axis 7 extends through the centre of each of the control coils 20 and 21 and the coils are oriented in such a way relative to the cooperating permanent magnetic means that each of the parallel sides of each turn is parallel to an imaginary connecting line between a zone of north polarity and a zone of south polarity.

On each axial side of the pivoting mirror 1, viewed axially the zones of north polarity N and the zones of south polarity S are arranged in similar pattern and with a similar orientation relative to the pivoting axis 7.

The permanent magnets 22 to 25 inclusive and 26 to 29 inclusive form part of the magnetic circuits 18 and 19 respectively, which at a side situated nearer the pivoting mirror 1 each comprise a soft-iron plate 46 and 47 respectively. The permanent magnets are secured to said plates by a suitable glue and function as a magnetic short-circuit between the zones of north polarity and the zones of south polarity of the permanent magnets mounted on them.

In FIG. 3 the direction in which a direct current flows through the conducting wires 30 and 35 at a given instant is symbolically represented by the open arrows. For the given polarities of the permanent magnets and the given directions of the currents through the turns of the coils, the control coils exert forces on the permanent magnets. These forces are symbolically represented by force vectors. As is apparent from the Figure, an effective use is made of the coils, because all the longer parallel sides are always involved in exerting the electromagnetic forces on the permanent magnets. The turns extend substantially perpendicularly to the lines of the field of the permanent magnets, so that maximum Lorenz forces are produced. Homogeneous stray magnetic fields, whatever their orientation relative to the pivoting axis 7, produce forces which compensate for each other, so that no net influence is exerted on the pivoting mirror device by these stray fields. The same applies to inhomogeneous stray magnetic fields which are symmetrical relative to a plane perpendicular to the pivoting axis 7 and passing through the point M (FIG. 3) of the pivoting axis which is situated midway between the two magnetic circuits. In order to appreciate this, it should be realised that in a plan view each of the magnetic circuits 18 and 19 exhibits the same pattern of magnetic zones in a similar orientation relative to the pivoting axis 7, whilst for the same spatial symmetry the magnetic field that is observed in plan view is mirror-inverted in the perpendicular plane through M relative to the plan view on the other side.

Another embodiment of the invention, which is not shown, will be described by means of FIG. 3. In this embodiment the two control coils are of a different shape from those of the embodiment described above. One of these coils comprises the sides 31 and 32 of the turn 30 as well as the sides 38 and 39 of the turn 35. These sides then constitute the short sides of turns which are interconnected by long sides which are disposed obliquely relative to the pivoting axis. Similarly, the other control coil comprises the sides 33 and 34 of the turn 30 and the sides 36 and 37 of the turn 35.

It is alternatively possible to use an embodiment of the invention in which each magnetic circuit is integrated to a single component of a ferrite, plastoferrite or other suitable magnetic material in which the zones of north polarity and the zones of south polarity are formed by local magnetisation.

What is claimed is:

1. A device for pivoting an optical element, such as a pivoting mirror (1) for an optical video disc player, under electrodynamic control, which device comprises:
    a frame (4),
    an optical element (1) which is supported by the frame so as to pivotable about a pivoting axis (7),
    a pivotal bearing arrangement for pivotably supporting the optical element (1) on the frame (4) and comprising pivotable bearing means (8) connected to the optical element and stationary bearing means (9) connected to the frame, permanent magnetic means (22-25; 26-29), connected to the optical element, on at least one side of the optical element, and control-coil means (20; 21), connected to the frame, for generating an electromagnetic control field and thereby exerting a pivoting moment on the permanent magnetic means, characterized in that the permanent magnetic means (22-25; 26-29) are situated on at least one of the axial sides of the optical element (1), that, on each axial side where permanent magnetic means are situated, said means comprise two zones of north polarity (N) and two zones of south polarity (S), that said magnetic zones are situated in a plane perpendicular to the pivoting axis (7), that the North zones (N) are situated diametrically opposite each other at equal distances from the pivoting axis (7) and the south zones (S) are also situated diametrically opposite each other at equal distances from the pivoting axis (7), that the control coil means comprise a control coil (20; 21) having turns (35; 30) with parallel sides (31-34; 36-39) which extend over a permanent magnetic zone and having portions (40-42; 43-45) connecting said parallel sides, which portions are situated outside the magnetic zones, that the pivoting axis (7) extends through the centre of the control coil, and that relative to the permanent magnetic means (22-25; 26-29) the control coil (20; 21) is oriented in such a way that each of the said parallel sides (31-34; 36-39) of each winding (35; 30) is parallel to an imaginary connecting line between a zone of north polarity (N) and a zone of south polarity (S).

2. A device as claimed in claim 1, wherein said permanent magnetic means is situated on both axial sides of the optical element (1) and characterized in that on each axial side, viewed axially the zones of north polarity (N) and the zones of south polarity (S) are arranged in a similar pattern and with a similar orientation relative to the pivoting axis (7).

3. A device as claimed in claim 1, characterized in that the permanent magnetic means (22-25; 26-29), on each of the sides where they are situated, form part of a magnetic circuit (18, 19) which comprises portions (45, 46) situated nearer the optical element (1), which portions produce a magnetic short-circuit between zones of north polarity (N) and zones of south polarity (S).

* * * * *